United States Patent
Arnold, Jr.

(10) Patent No.: US 8,241,724 B2
(45) Date of Patent: Aug. 14, 2012

(54) SYSTEM AND METHOD FOR MAKING COMPOSITE MATERIAL COMPONENTS

(75) Inventor: Charles Edward Arnold, Jr., Waxahachie, TX (US)

(73) Assignee: The Boeing Company, Chicago, IL (US)

( * ) Notice: Subject to any disclaimer, the term of this patent is extended or adjusted under 35 U.S.C. 154(b) by 41 days.

(21) Appl. No.: 12/840,012

(22) Filed: Jul. 20, 2010

(65) Prior Publication Data

US 2010/0323146 A1    Dec. 23, 2010

Related U.S. Application Data

(62) Division of application No. 11/669,834, filed on Jan. 31, 2007, now Pat. No. 7,793,400.

(51) Int. Cl.
*B32B 7/04* (2006.01)
(52) U.S. Cl. .............. 428/99; 29/411; 29/416; 428/119; 428/121
(58) Field of Classification Search .............. 428/99, 428/119, 121; 29/411, 416
See application file for complete search history.

(56) References Cited

U.S. PATENT DOCUMENTS

| | | | |
|---|---|---|---|
| 2,343,119 A | 2/1944 | Hyman | |
| 2,437,534 A | 3/1948 | Morris | |
| 3,343,660 A | 9/1967 | Bailey | |
| 3,751,730 A | 8/1973 | Zamist | |
| 4,020,789 A | 5/1977 | Gamvrellis | |
| 4,397,898 A | 8/1983 | Ray | |
| 5,051,293 A | 9/1991 | Breitscheidel et al. | |
| 5,181,814 A | 1/1993 | Woods et al. | |
| 5,297,682 A | 3/1994 | Miltenberger | |
| 5,506,020 A | 4/1996 | Haberkorn | |
| 5,643,383 A | 7/1997 | Allegre | |
| 5,944,252 A | 8/1999 | Connelly et al. | |
| 6,381,812 B1 | 5/2002 | Crider et al. | |
| 6,472,044 B1 | 10/2002 | Vichinsky et al. | |
| 2003/0193488 A1 | 10/2003 | Bean | |

OTHER PUBLICATIONS

Sadake, Florence, "Origami Japanese Paper-Folding", Piano, Second Edition, Tuttle Publishing, Printed in Singapore, 1958, 2002, pp. 63-65.
International Search Report and Written Opinion issued for PCT/US2008/050875; Jul. 8, 2008, 10 pages.

*Primary Examiner* — Brent Ohern
(74) *Attorney, Agent, or Firm* — Yee & Associates, P.C.

(57) ABSTRACT

A system for making and using composite material components is disclosed. Composite material components are preferably constructed in patterns where every part needed for a given filler is included in a single series pattern. Using these series patterns, the material can be cut, folded and the parts created in a manner such that the individual parts forming a single filler are releasably attached to one another, thus resulting in effective and efficient organization of these parts. The filler panels can then be arranged into a folding stack of offset edges. Two shapes are preferably used with subtle differences between each at the fold area. Different patterns can be used to have the first two panels in the series positioned at 0 degrees, followed by two panels positioned at 45 degrees, and then alternating the angle positions throughout the pattern. The pattern preferably incorporates triangular portions or tabs between each set of panels in the series to help in establishing a fold line. These tabs forming part of the composite material component system are then discarded after the filler panels are created.

17 Claims, 9 Drawing Sheets

SYSTEM AND METHOD FOR MAKING COMPOSITE MATERIAL COMPONENTS

This application is a divisional of application Ser. No. 11/669,834, filed Jan. 31, 2007, status allowed.

TECHNICAL FIELD

This invention relates in general to the field of composite material and more particularly, to a system and method making composite material components or assemblies. The invention is particularly useful for use in making composite components for the aerospace industry.

BACKGROUND OF THE INVENTION

The manufacture of composite material components generally require use of a large number of individual parts or panels, comprised of various types, sizes, orientations and thicknesses of materials required to support the construction of various composite parts. Specifically, the aerospace industry requires a large number of panels (which may be referred to in the aerospace industry as plies, and thus may be used interchangeably) to be used as filler materials, in order to construct a single aircraft. These filler materials comprise a number of panels having a variety of shapes and sizes, but sometimes a large number of panels having similar size and shape are required. As an example, graduated sizes of nearly rectangular panels of filler material sometimes need to be prepared such that many panels can be compacted together for use in construction of an aircraft. In order to obtain each of these individual panels of filler material, each panel would have to be cut individually from a fabric sheet. In an alternative manner of development, panel parts having a similar size have been designed in a series pattern to be cut together, but the panel parts would later have to be separated using a cutting device.

When the number of panel fillers needed for construction reaches large quantities, the number of panels (or plies) required increases by as much as approximately tenfold. This increase in the number of panels required sometimes results in a laminate build-up with bevels on all four edges. The graduation of sizes produces the bevel shape, as the part would not be trimmed after compaction. Some attempts have been to compact large pieces of fabric into a laminate, corresponding to the necessary filler thickness, and then the panel fillers would be cut using a ply cutter, such as an AGFM 6 axis ply cutter. However, the appropriate tooling is not always available which makes this a less viable option.

Alternatives to cutting each panel individually includes cutting rectangles of material into individual panels of a certain size and then compacting those rectangles to build a filler. Each panel is graduated by a certain offset to be a different net size, so as the second panel would be offset again from the net size of the first panel, and so forth until the number of panels (or plies) needed for the laminate was complete. With this method of preparing panels, given the volume of pieces and the number of different types of panels needed, it presents a challenge to keep the panels organized so that the desired panels can be easily identified and selected for use in the compacting process to form a filler. Having each panel separate requires marking and tracking each panel individually. Further, given that the panels would typically be strewn across a compaction table, the panels would have to be collected from the table to form a kit for later assembly and thus the laminate may need to be created at the compaction table. This results in reduced flexibility in where and how these fillers are prepared for use in the construction process, particularly given that the pieces would have to be stacked sequentially to meet requirements for proper assembly.

Other options for preparation of these fillers have included using tab-out stringers; building ply blankets and then cutting out the panels using a cutter, such as an AGFM cutter; using a Gerber cutter; using a two-step filler (filler and postage stamp); and using a one-step filler plus shear tie shim. Use of tab-out stringers has shown not to be preferable as there is significant material waste. When a ply blanket is built, the AGFM knife must cut through several lengths of material bearing the pattern at the same time and this is not an easy task to perform with an AGFM. When a traditional Gerber cutter is used, each panel must still be cut individually and each piece must be selected individually from the compaction table once cut. Further, the Gerber cutter only cuts a 90 degree cut. Thus, use of this method results in no time savings. Using a two-step filler process results in lay-up complexity (hand lay-up, automation issues, location tolerance), assembly complexity (shear-tie foot, probability of shimming), tooling complexity, and engineering complexity. Similarly, the one-step filler plus shear tie shim process results in lay-up complexity (hand lay-up), automation issues (location tolerance), assembly complexity (shear-tie foot, probability of shimming), tooling complexity, as well as engineering complexity.

These prior methods described above require time-consuming manual preparation and organization of the panels to later be used in filler materials. When the same selection of panels are to be used over and over again, a problem results in that these panels are not being organized or stacked together initially, and thus, the user has to search for the appropriate panels each time a filler is to be prepared. As the number of small parts needed increases, the number of steps for cutting the small parts increases as well.

BRIEF SUMMARY OF THE INVENTION

The present invention is directed to a system and method for preparing and organizing a large number of parts to be used together in a manufacturing process. These parts are prepared and organized using a folding process wherein the parts are formed as a connected kit. One embodiment is directed to a method for making a composite material component including the steps of providing a blank fabric sheet, forming a first panel in the fabric sheet, forming a second panel in the fabric sheet adjacent to and releasably separated from the first panel to form a first panel pair, forming a second panel pair adjacent to and releasably separated from the first panel pair by a tab. The method may preferably include forming the tab having two adjacent triangular portions releasably separated from one another. Additional panel pairs may be formed in an embodiment of the method of the present invention, and each panel pair is preferably separated by tabs. Further embodiments provide for forming a postage stamp adjacent to and releasably separated from one of the panel pairs by a tab, and additionally or alternatively forming the postage stamp at the end of the fabric sheet.

In a further embodiment, a composite material component system is disclosed comprising at least two panels releasably attached by a fold line to form a panel pair, and plural panel pairs releasably attached by a tab. The tab may preferably have two adjacent triangular portions releasably separated from one another. The system may further include a postage stamp releasably separated from a panel by a tab. This postage stamp may preferably be releasably separated from a panel by a tab having two adjacent triangular portions releasably separated from one another. Additionally or alternatively, the postage stamp may be releasably separated from a panel by a tab at the end of the fabric sheet.

In another embodiment, a composite material component preferably formed by the method disclosed in the present invention may preferably be folded allowing for use of individual component parts by folding the first panel of the first panel pair that is marked over the adjacent panel of the first panel pair, folding tab outside the folded first panel pair, folding the next panel adjacent to the tab underneath the folded first panel pair, and folding remaining panels and tabs into stacks until the final panel in the composite material component is reached. The tabs are then separated from the stack of panels.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

According to embodiments of the present invention, filler patterns can be constructed wherein every part needed for a given filler is included in a single series pattern. Using these series patterns, the material can be cut, folded and the parts created in a manner such that the individual parts forming a single filler are releasably attached to one another, thus resulting in effective and efficient organization of these parts as will be described in detail below. The filler panels can then be arranged into a folding stack of offset edges. Two shapes are preferably used with subtle differences between each at the fold area. Different patterns can be used to have the first two panels in the series positioned at 0 degrees, followed by two panels positioned at 45 degrees, and then alternating the angle positions throughout the pattern. The pattern preferably incorporates a triangular portion between each set of panels in the series to help in establishing a fold line. The cut line is not a straight line in that it curves back so that when a fold is made, there is overlap in folding. The triangular portion is then discarded after the filler panels are created by cutting or tearing if possible. It should be appreciated that when a 0 degree angle is referenced, it is equivalent to a 90 degree angle, and similarly, a −45 degree and a 45 degree angle are equivalent. The tolerance for these fiber angles is about the range of 3-5 degrees.

Figure 1:
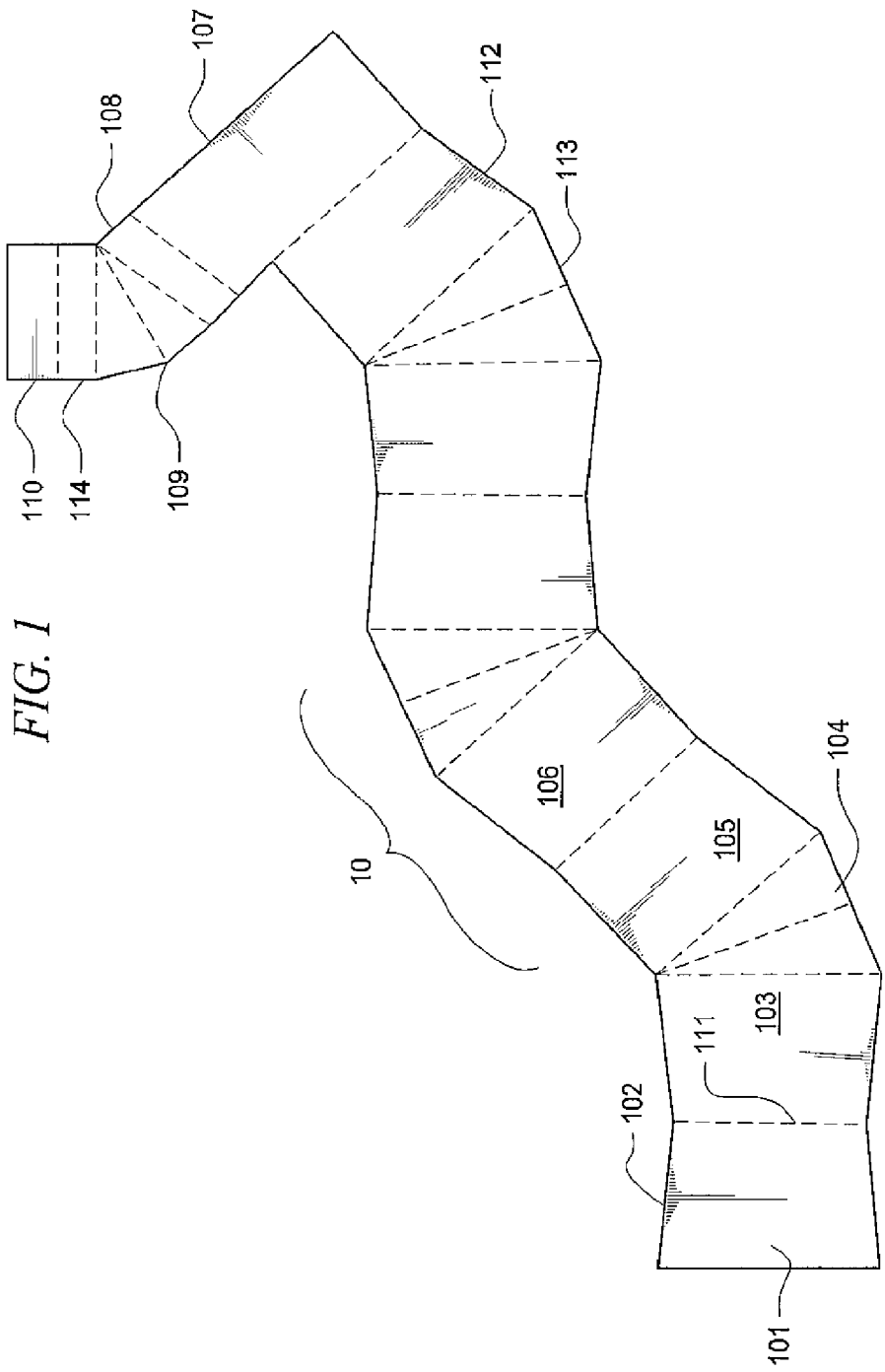
FIG. 1 depicts a fold-up according to an embodiment of the present invention.

FIG. 1 depicts fold-up 10 according to an embodiment of the present invention. Fold-up 10 is comprised of a series of panels (or component parts) positioned at different angles and, in some instances, having varying shapes. Panels 101 and 103 are divided by fold line 111. Fold line 111 is releasably attaching panels 101, 103 such that when the folding method contemplated by the present invention is completed, panels 101, 103 can be separated from one another, either manually or by other means, without necessarily requiring more involved separation techniques (i.e., use of a cutter). Panels 101, 103 are viewed to be virtually minor images of one another such that when these adjacent panels are folded on top of one another, panels 101, 103 will be relatively flush with one another, although to some degree, one panel typically may protrude beyond the edge of another panel (in a stair-step type manner) without departing from the objects or spirit of the present invention.

Panel 103 is separated from panel 105 by triangular portion 104. Triangular portion 104 is formed to be two triangle shapes merged together and positioned such that when fold-up 10 is folded beginning at panel 101, triangular portion 104 serves to change the angle of positioning, thus establishing the fold line when panels 105 and 106 are then folded. Pieces, such as triangular portion 104, are included after every two panels in fold-up 10; however, it should be appreciated that in alternative embodiments of the present invention, triangular portion 104 may be included more or less often than after every two panels without departing from the objects of the present invention.

Further, it should be appreciated that the panels in which triangular portion 104 precedes do not have to be the same size and shape. As an example, panel 107 is of a different size and shape than panel 112; however, triangular portion 113 precedes panel 112. In this instance, panel 107 is included as part of the fold-up when a larger sized part may be desirable and further, panel 107 serves to change the directionality of fold-up 10 at the tail-end of the folding process.

Fold-up 10 includes postage stamp pieces. These postage stamps are small pieces used within the industry to equalize areas where a filler will connect between two parts (such as stringers) of unequal thickness at a given location. There can be as many as five postage stamp pieces on the end of a typical fold-up, although only three postage stamps 108, 110, 114 are depicted in FIG. 1. Postage stamps may preferably be incorporated into a fold-up in a variety of different embodiments. In one embodiment, the last filler panels of the fold-up are extended long enough to include the postage stamp. In another embodiment, the postage stamp pieces are folded out from the last panel. In this manner, the postage stamp folds into the filler panel and can then be extended to allow for any shape desired and for as many postage stamps as are needed. Regardless how the postage stamps are incorporated, only one piece of material is preferably needed in order to handle any one filler to be created.

Panels 101, 103 are positioned at a 90 degree angle while panels 105, 106 are positioned at a 45 degree angle. It follows that the next pair of panels following panels 105, 106 are positioned at a 90 degree angle similar to panels 101, 103. By alternating the angle at which sets of panels are positioned, the method of folding contemplated by the present invention may be more easily achieved so as to change the direction of the fold line and thus allowing triangular portions 104, 109 to be separated from the panels in the folding process. It should be appreciated however that angles of positioning other than 90 degrees and 45 degrees may preferably be used without departing from the objects of the present invention.

Figure 2:
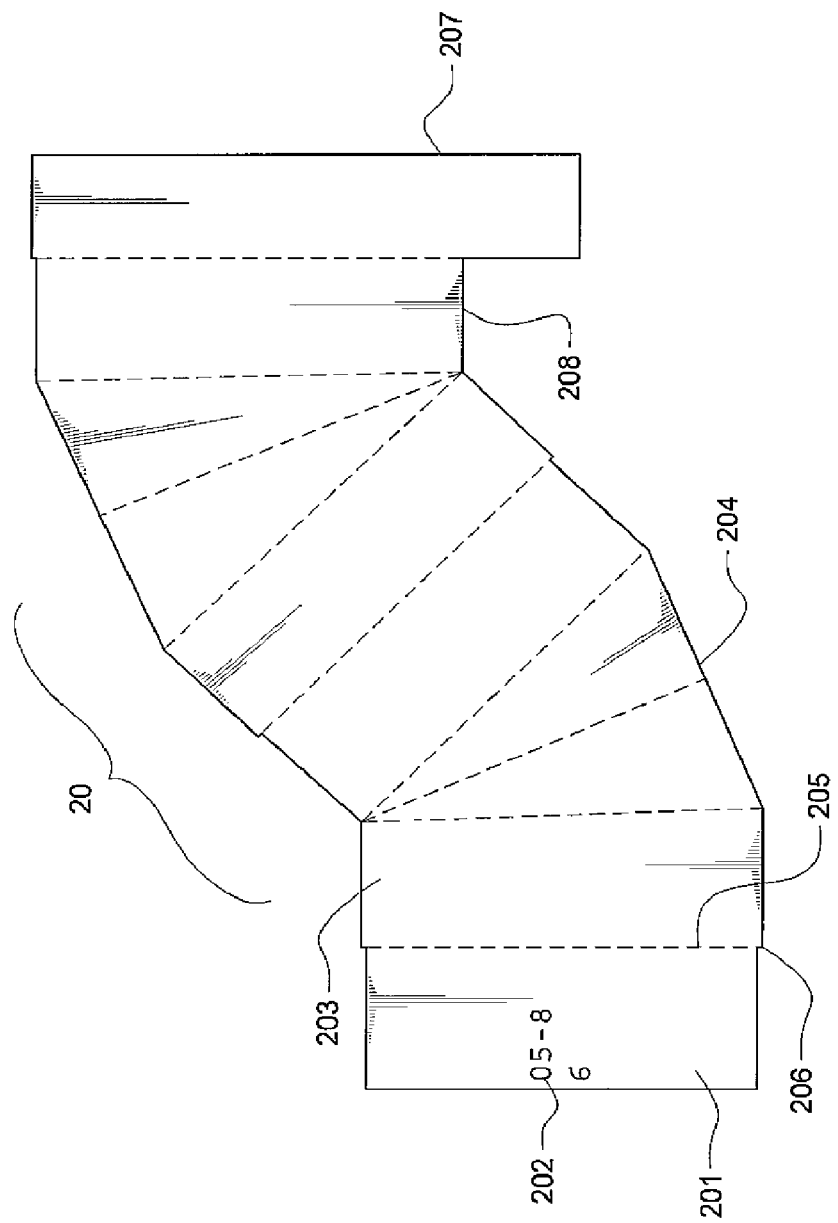
FIG. 2 depicts a fold-up according to an embodiment of the present invention.

FIG. 2 depicts another embodiment of the present invention. Fold-up 20 includes a series of panels with triangular portions interspersed between sets within the series of panels. Panels 201, 203 are separated by fold line 205 wherein, similar to what has been previously described with respect to FIG. 1, fold line 205 releasably attaches panels 201, 203 such that when the folding process is completed, panels 201, 203 can be separated from one another. Also, similar to the embodiment depicted in FIG. 1, panels 201, 203 are positioned at a 90 degree angle while the panels following triangular portion 204 are positioned at a 45 degree angle.

The presence of marking 202 incorporated into panel 201 should be noted. Marking 202 is present for a variety of reasons but generally to provide the user with an indication as to identifying the panel within fold-up 20 where the folding process should begin. The folding method is set forth in FIG. 9. The user will preferably pick up fold-up 20 (step 905 of FIG. 9) and starting with panel (or ply) 201, will fold this panel such that it is placed on top of panel 203 (steps 906 and 907 of FIG. 9). The fold-up process occurs until all panels are folded on top of one another and the respective triangular portions are to the side of the panels, though still attached to the panels (steps 908-910 of FIG. 9). When all of the panels have been folded, marking 202 will be visible on panel 201, as this panel preferably will be on the top of the panel stack (step 912 of FIG. 9). While marking 202 is depicted in FIG. 2 as having a series of numbers, it should be appreciated that any lettering, numbering or inclusion of symbols or other types of markings that is desired by the user may be incorporated on the panel or piece without departing from the objects of the present invention. Regardless what type of identifier is used for the marking, the marking provides an identifier for the stack of panels once folded, such that each panel in the stack does not have to be individually marked. Thus, marking 202 preferably serves as the designation for the entire stack of pieces. This is a benefit of the present invention in that once the panels have been folded, all of the panels are still connected, but marking 202 may preferably still be used as a double-check to ensure that the correct panels are included in the stack, the right number of panels are included, and as they are all connected, the user does not have to search for the appropriate panels when the time arrives for those selected panels within the stack to be utilized.

Marking 202 includes numbers on the top panel, and these numbers may indicate the number of thicknesses (i.e., the number of panels included in the stack) and/or the particular part number where the panels are to be applied among other identifiers that may be relevant to the stack of panels. The stack is arranged such that marking 202 is visible and can be used as a guide for placement when it is properly oriented. Marking 202 is used for assistance to start the folding process and organize the individual panels forming the stack; otherwise, one would have to label each panel individually. As such, marking time is reduced by as much as 90 percent on average. Marking 202 also is used as a check to know how many panels are included as part of the filler.

Fold-up 20 depicted in FIG. 2 is slightly different in pattern when compared to fold-up 10 of FIG. 1 in that fold-up 20 does not incorporate postage stamp pieces. Sometimes these postage stamp pieces are not required for preparation of a particular filler, for example, and thus, the pattern of fold-up 20 is made without inclusion of such postage stamp pieces. However, it should be noted that panels 207, 208 have been incorporated into fold-up 20, having slightly different shapes when compared to panels 201, 203. When all of the panels forming fold-up 20 have been folded in accordance with the process contemplated by the present invention, the panels preferably lay on top of one another in a stair-step type pattern.

The patterns for the fold-ups depicted in FIGS. 1 and 2 are preferably created using computer modeling software wherein the points are manually gathered on the periphery. Those points are then loaded into an executable program to create a file wherein the points are pulled off the corners of the solid material being modeled. The points are scattered to the format of a fold-up, and the surface and boundary points for the fold-up are compiled into a file to be preferably loaded into a software program, such as Autocad. It should be appreciated that, for some fillers that are more unique in design, the user may have to first manually offset for additional panels prior to exporting the ply geometry to a software program, such as Autocad. The pattern(s) may then preferably be projected onto the material for cutting using a ply cutter. The type of ply cutter used to cut the pattern is not critical to the invention as various ply cutters have been used to create patterns for fold-ups, including Gerber ply cutters and AGFMs, although some ply cutters may be less desirable to use because of the time required to operate.

Figure 9:
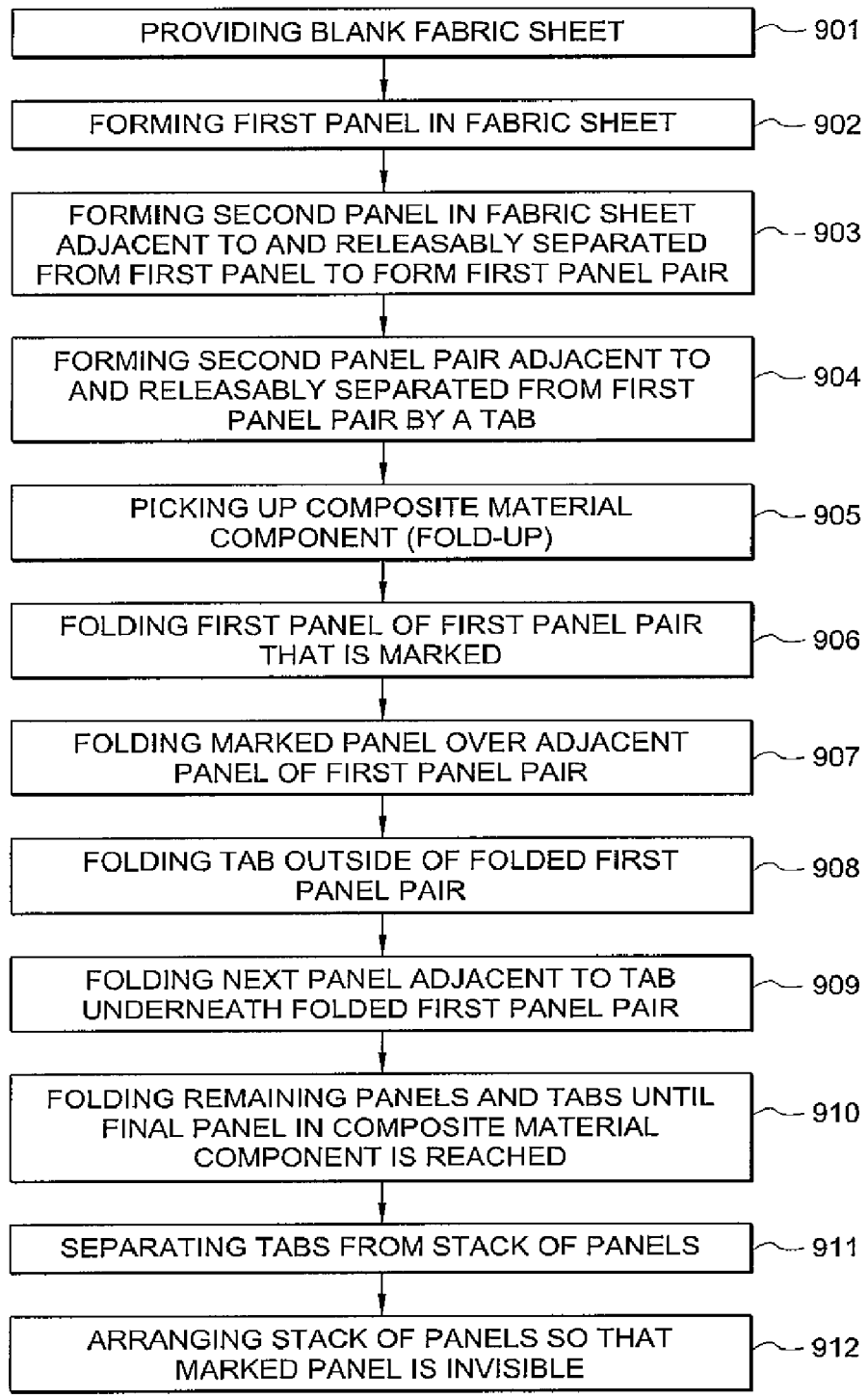
FIG. 9 is a flow chart depicting a method for forming a composite material component system according to the present invention.

Fold-ups such as those depicted in FIGS. 1 and 2 are folded to result in the appropriate thickness and panel (ply) types needed for a particular filler by designing the desired pattern on a blank fabric sheet (step 901 of FIG. 9) and laying this design on the desired filler material (steps 902-904 of FIG. 9). The cut pattern is then removed from the desired filler material. The panel containing markings (see FIG. 2, marking 202) is held (step 905 of FIG. 9) and the panel adjacent to the marked panel is folded underneath (steps 906-907 of FIG. 9). The triangular portion is folded outside of the folded panels in order to allow for change in the fold direction (step 908 of FIG. 9). The next panel adjacent to the triangular portion is folded under (step 909 of FIG. 9), and the process of folding the panels together and the triangular portions separate from the panels is continued until the final panel is reached (step 910 of FIG. 9). After all of the panels have been folded into a stack (see FIG. 3), the triangular portions are separated from the stack of panels (see FIG. 4 and step 911 of FIG. 9). The stack is then placed to the side with the panel containing the markings on top, such that the markings identifying the stack are visible (step 912 of FIG. 9). Orienting the markings in this manner is important so that the panel stack may be identified even after compaction has occurred.

In order to cut the panels (such as half-inch wide strips of material), the strips remain connected by cutting all but approximately the last 0.050 of each end. In this respect, all the panels of a roll-up are still connected and can be rolled up for ease of handling. Then the uncut tab can be slit or torn apart in order to separate the panels when the time arrives for the stack to be separated into individual panels. Similarly, for postage stamp pieces, multiple postage stamp pieces can be cut together in one pattern (see FIG. 1). When two or more postage stamp pieces are needed, they can be prepared in series and then folded. These postage stamp pieces can be interwoven with those cut at 45 degrees to maintain fold orientation as needed (i.e., alternating the plies of 0 and 45 degree orientation as shown in FIG. 1).

Figure 3:
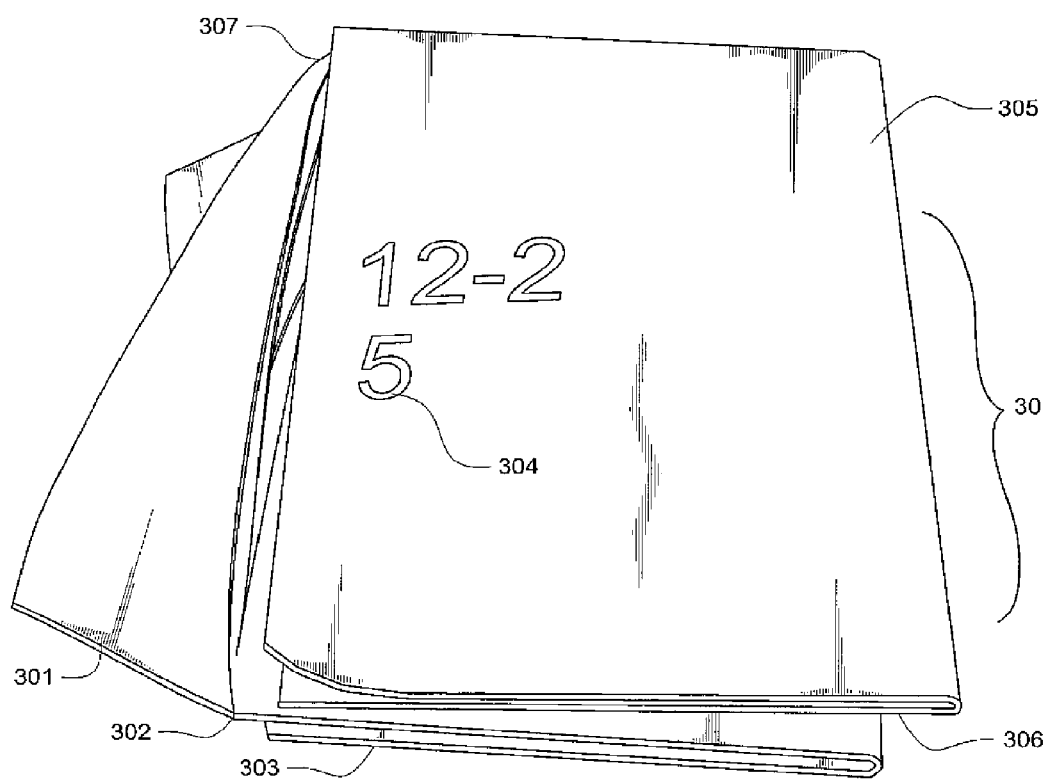
FIG. 3 depicts an embodiment of a fold-up wherein the fold-up has been folded according to an embodiment of the present invention and the triangular portion has not been removed.

FIG. 3 depicts an embodiment of the present invention showing what fold-up 20 preferably looks like when the panels have been folded but before separation of the triangular portions has occurred. Marking 304 is shown as being on top panel 305 of the stack of panels 30 and thus visible to the user to determine what types and number of panels should be included in the stack. Triangular portions 301 are shown as not being part of the stack of panels 30; however, triangular portions 301 are still releasably attached to the stack of panels at corners 302, 307. When the user is preparing to utilize panel stack 30, that user will separate triangular portions 301 from stack 30 by pulling or tearing triangular portions 301 apart from stack 30 at corners 302, 307. Also as shown in FIG. 3, stack 30 includes a variety of panels in addition to top panel 305 wherein these panels are folded to form stack 30. The panels are not all of the same size and thus some of the panels protrude from below top panel 305, such as panels 303, 306, forming a stair-step pattern. It should be appreciated that the stair-step pattern will later disappear and the edges will become smooth once the stack has been cured.

Figure 4:
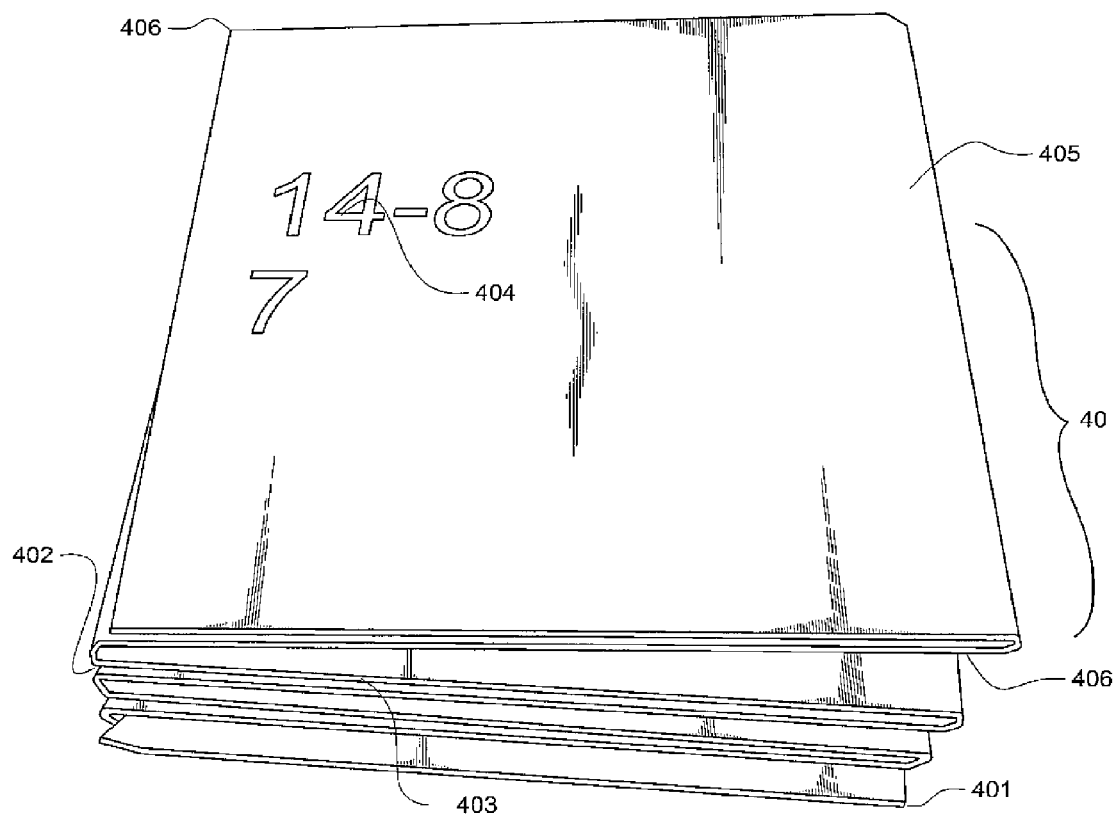
FIG. 4 depicts an embodiment of the present invention wherein the triangular portion included initially in the fold-up has been removed.

Turning to FIG. 4, there is depicted what fold-up 20 (FIG. 2) looks like when the triangular portions have been detached from the stack of panels. Similar to that depicted in FIG. 3, stack 40 includes top panel 405 having marking 404 to confirm the number and type of panels included in stack 40. Corners 402, 406 that were previously attaching the triangular portions that were part of the initial fold-up to stack 40 are still present as part of stack 40; however, now they are serving to releasably attach the panels comprising stack 40 to one another. Again, the stair-stepping pattern of the panels 401, 403 comprising stack 40 is depicted in FIG. 4.

Figure 5A:
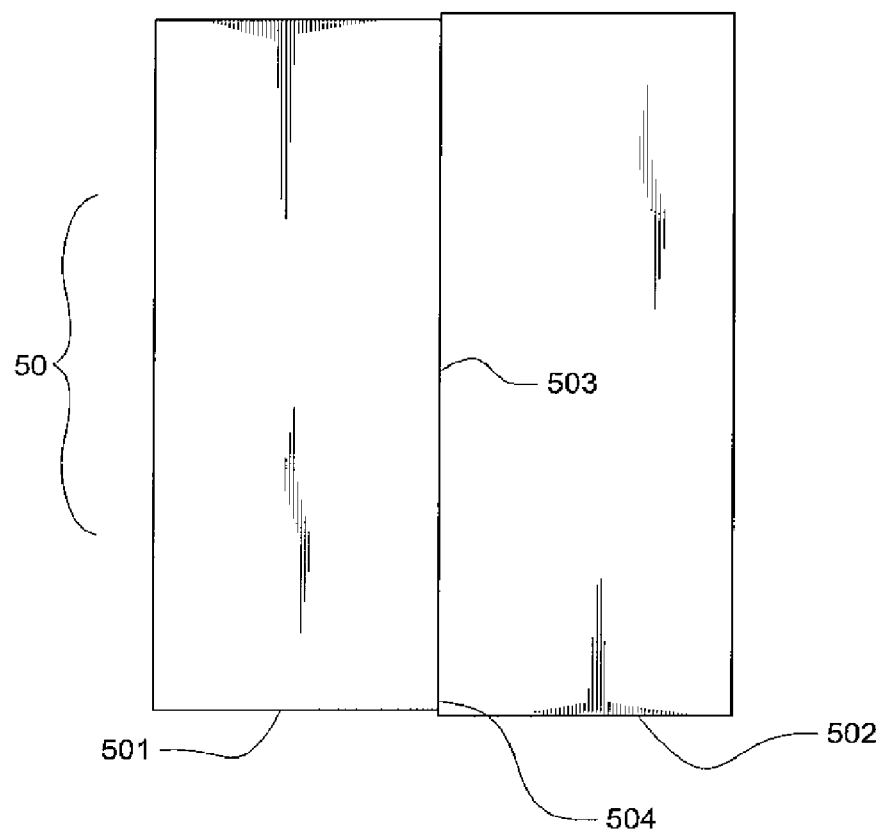
FIG. 5A depicts two panels of a fold-up according to an embodiment of the present invention wherein a straight line cut is incorporated.
Figure 5B:
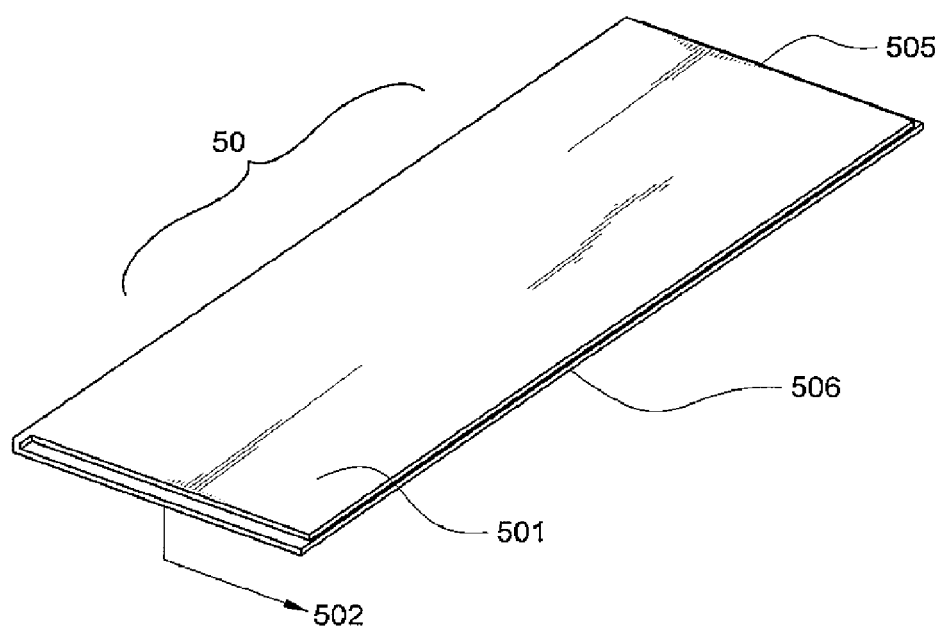
FIG. 5B depicts the two panels shown in FIG. 5A when folded on top of one another.

FIGS. 5A and 5B represent before-and-after depictions of a pair of panels wherein a straight fold line has been employed. FIG. 5A depicts pair 50 wherein panels 501, 502 have not yet been folded. Fold line 503 is a straight line dividing cut, and also shown in FIG. 5A is protrusion 504 demonstrating that panels 501, 502 are not perfectly symmetrical such that the panels will lie as stair-steps on top of one another when folded. Turning to FIG. 5B, there is represented a pair 50 once panels 501, 502 have been folded. Having fold line 503 be a straight line dividing cut produces panel edges that are directly above one another. While panel 502 protrudes slightly from underneath panel 501, panel edges 505, 506 are directly above one another.

Figure 6A:
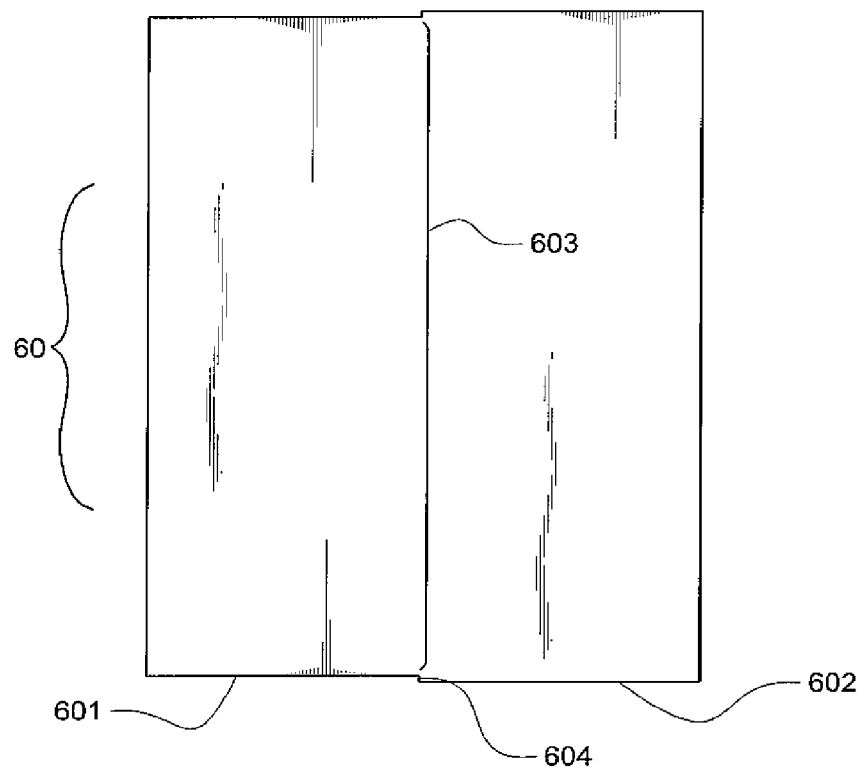
FIG. 6A depicts two panels of a fold-up according to an embodiment of the present invention wherein a curved or angled line cut is incorporated.
Figure 6B:
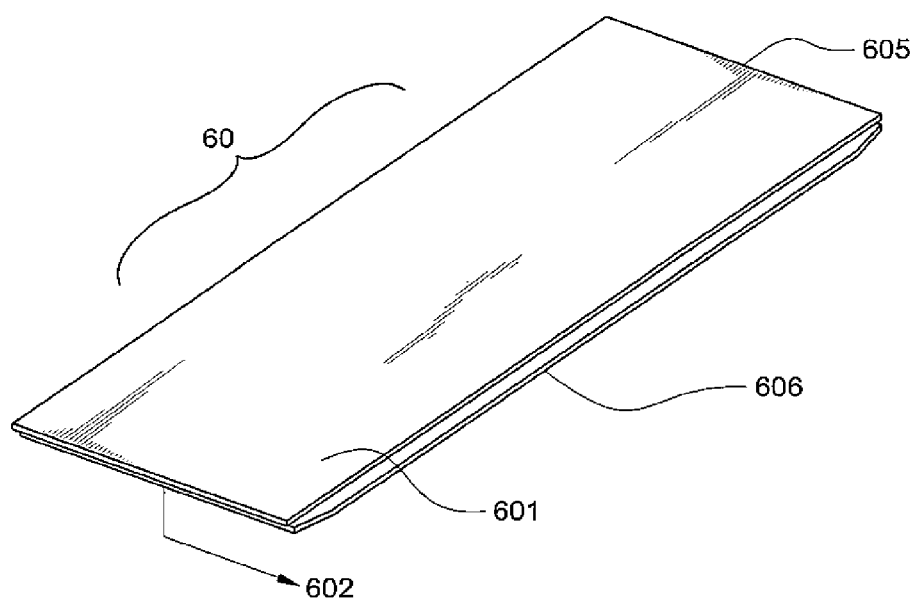
FIG. 6B depicts the two panels shown in FIG. 6A when folded on top of one another.

While a straight line dividing cut has been employed in connecting pair 50 depicted in FIGS. 5A and 5B, it should be appreciated that other dividing cuts may be employed without departing from the object and spirit of the present invention. In another embodiment, depicted in FIGS. 6A and 6B, a curved fold line has been utilized. Similar to FIG. 5A, FIG. 6A depicts pair 60 wherein panels 601, 602 have not yet been folded. Fold line 603 is a curved line cut, and also shown in FIG. 6A is protrusion 604 demonstrating that panels 601, 602 are not perfectly symmetrical and thus lie in stair-step formation when folded. Turning to FIG. 6B, there is represented a pair 60 once panels 601, 602 have been folded on top of one another. Having fold line 603 be a curved cut produces a staggered edge for subsequent panels. Thus, as shown in FIG. 6B, panel edge 606 of panel 602 protrudes in a staggered manner with respect to panel 601; however, edges 602, 605 are essentially aligned.

Figure 7:
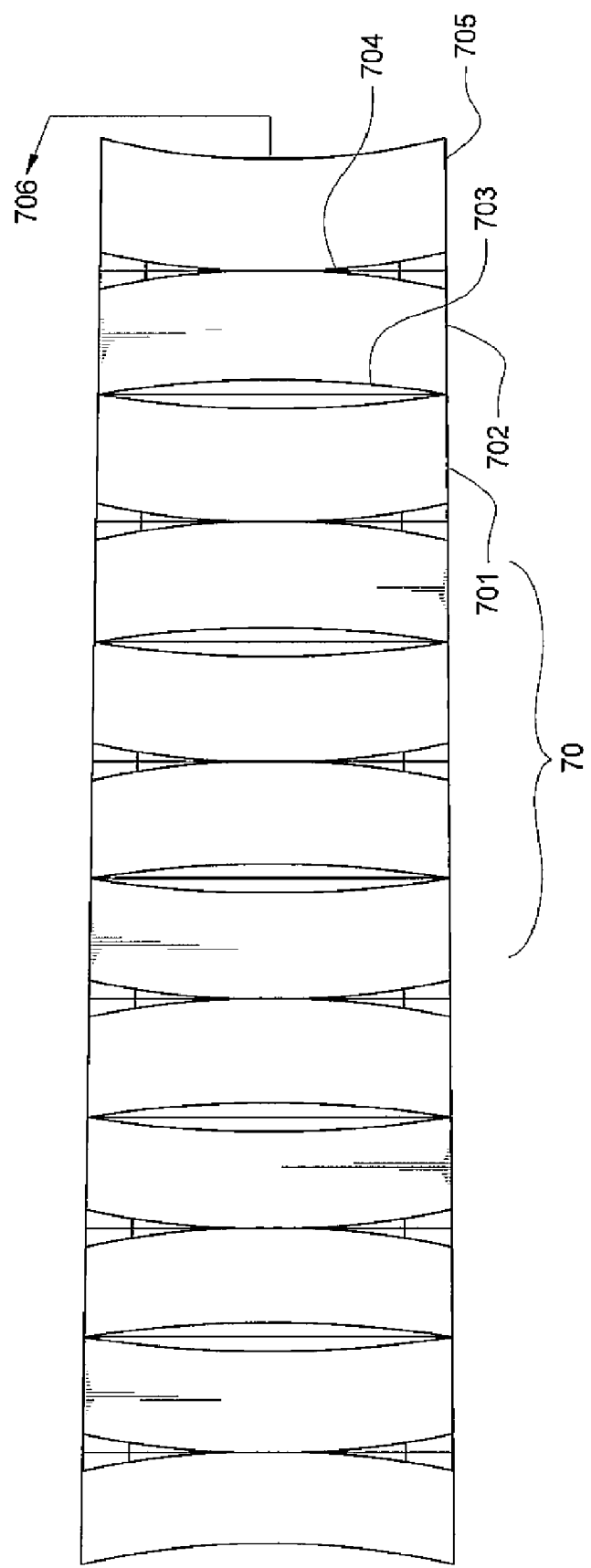
FIG. 7 depicts an embodiment of the fold-up according to the present invention where a series of curved cut panels are used.

Turning to FIG. 7, an embodiment of a fold-up contemplated by the present invention is depicted wherein fold-up 70 is formed using a series of panels 701, 702, 705 having curved edges on the sides of the panels. While a circular pattern, such as that depicted in FIG. 7, is more challenging to use in order to arrange a tight pattern with good material utilization, the curved edges still allow for folding in accordance with the present invention. Having these curved edges means that instead of having triangular portions separating the panels, the panels are preferably connected via these curved lines or curvatures. As an example, curvature 704 separates panels 702, 705 having triangular portions at the far ends of the panel connections. Thus, panels 702, 705 are connected at a point midway down the panel as compared to being connected using the far corners as has been depicted in FIGS. 1 and 2. However, panels 701, 702 are separated by curvature 703 wherein panels 701, 702 are still connected at the end points of the panels but the separation part is more circular than triangular.

Figure 8:
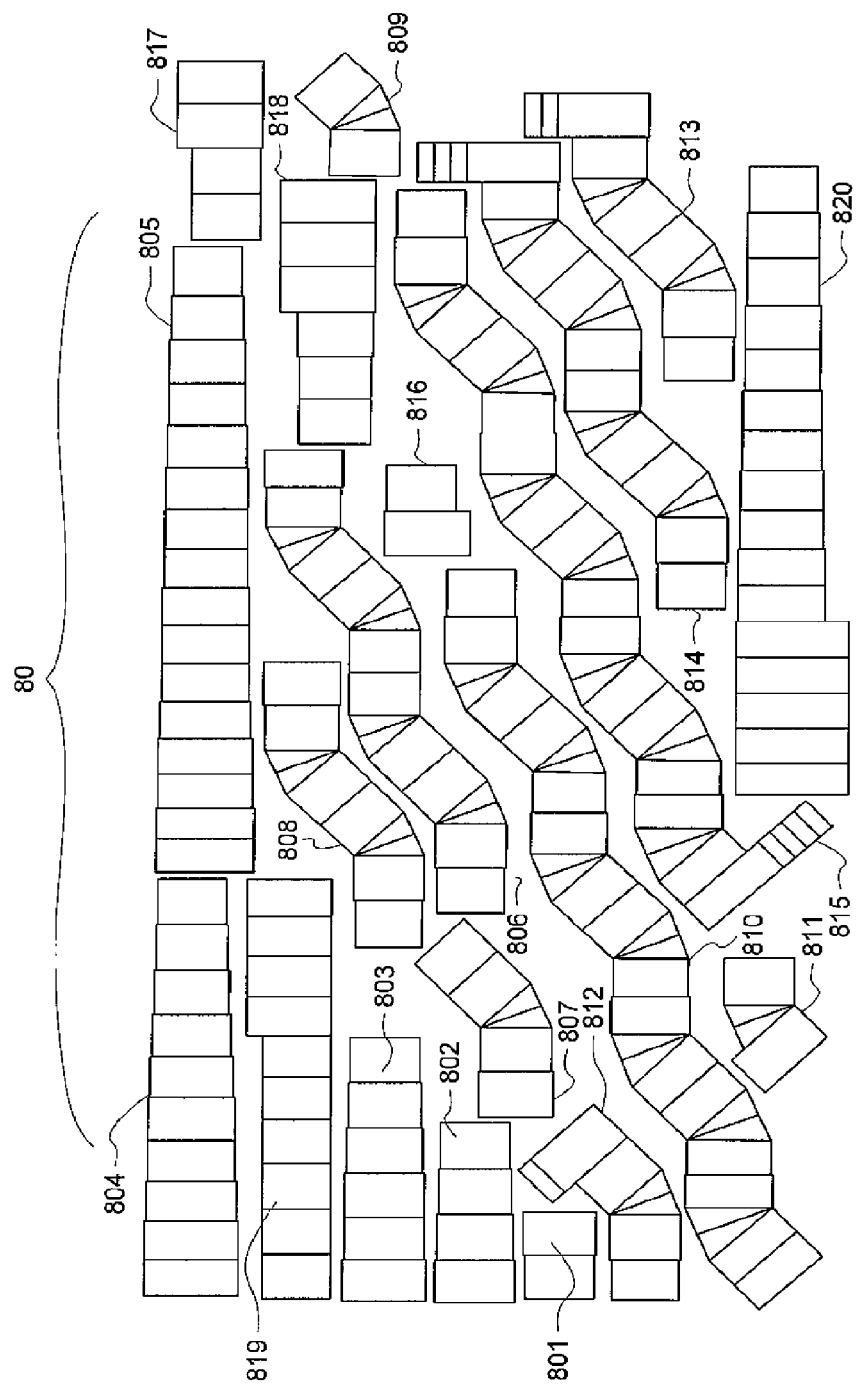
FIG. 8 depicts a pattern for a series of fold-ups of varying shapes and sizes according to the present invention.

FIG. 8 depicts a series 80 of twenty panel patterns wherein the individual panel patterns are labeled 801-820. Panel patterns included in FIG. 8 include those having four different variants: (1) patterns having 0 degree positioning without the inclusion of postage stamp pieces; (2) patterns having 0 degree positioning and including postage stamp pieces; (3) patterns having 45 degree positioning without the inclusion of postage stamp pieces; and (4) patterns having 45 degree positioning and including postage stamp pieces. Patterns included in series 80 vary from 2-16 panels in size. Utilizing series 80, each of the different panel patterns can be designed to maximize the use of the material for making these panels by including all of these patterns on the same piece of material. It should be appreciated that depending on the cutting equipment being utilized and the dimensions of the material, fewer or more panel patterns could be included on the same piece of material without departing from the objects of the present invention. Some of the patterns include all 0 degree positioning (804, 805, 820, 801, 802, 803, 819) while the other patterns in FIG. 8 include both 0 degree and 45 degree positioning.

While embodiments of the method of preparing and organizing parts disclosed in conformance with this invention are useful for most shapes and sizes of panels and postage stamps, it should be appreciated that some filler parts are unique and may not be easily prepared using the method of the present invention.

Fold-ups contemplated by the present invention are prepared from a material that is flexible so as to permit folding yet the material is preferably somewhat rigid so as to reduce the likelihood of premature tearing during the folding process. Another characteristic of the material is that when the triangular portions are to be removed from the fold-up, these triangular portions can be removed manually as compared to requiring a cutting apparatus. Preferable materials for use in preparing fold-ups according to embodiments of the present invention include fiberglass, composite carbon, Kevlar, graphite and other carbon fiber woven materials. It should be appreciated that these materials also may be coated with a resin (epoxy, for example) to make a pre-preg, using commercially available processes, as is common in the aerospace industry. Pre-preg is typically prepared by dipping collections of fibers into a resin bath and then wringing out the material. Pre-preg is typically packaged with a protective cover sheet or backing material applied to protect it from contamination. The process of cutting may be performed with or without the backing material, but the backing material keeps the material from sticking to itself. As long as the material utilized is forgiving in that it can bend and compress, then it may be used in accordance with the method of the present invention.

The method contemplated by the present invention preferably eliminates more than one-half of the individual parts needed to be produced for any given filler. The volume of parts required will still be produced and installed but as a connected kit rather than as separate parts. Use of the method contemplated by the present invention further reduces the amount of time needed to produce the individual parts forming the filler in that the method eliminates the need to have each and every panel individually identified, handled several times, and then sorted several times, and further, this method reduces the concern about losing or damaging individual pieces. This is an improvement in time savings because it is desirable not to have to cut out each individual panel, and thus, while it should be appreciated that in some instances more material may be utilized to form the panels, the time savings in not having to prepare each panel individually and/or locate each panel when needed preferably outweigh the costs of the material.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A composite material component system comprising:
   a first panel and a second panel releasably attached by a fold line to form a first panel pair; and
   a third panel and a fourth panel releasably attached by a fold line to form a second panel pair,
   the first panel pair and the second panel pair releasably attached by a tab, the tab having two adjacent triangular portions releasably separated from one another, and wherein the first panel pair and the second panel pair are folded and stacked in a stair step configuration.

2. The composite material component system of claim 1 further comprising:
   a postage stamp releasably separated from a panel by a tab.

3. The composite material component system of claim 1 further comprising:
   a postage stamp releasably separated from a panel by a tab having two adjacent triangular portions releasably separated from one another.

4. The composite material component system of claim 1 further comprising:
   a postage stamp releasably separated from a panel by a tab at the end of said composite material component system.

5. The composite material component system of claim 1 further comprising:
   additional panel pairs, each panel pair separated by tabs.

6. The composite material component system of claim 1 wherein the second panel pair is oriented at about a 45 degree angle from the first panel pair.

7. The composite material component system of claim 1, wherein an upper panel in the stair step configuration comprises an identifying marking.

8. The composite material component system of claim 1, wherein the first panel and the second panel are releasably attached at corner portions of the first panel and the second panel.

9. The composite material component system of claim 8, wherein the first panel and the second panel are releasably attached at corner portions of the first panel and the second panel such that the first panel may be manually separated from the second panel.

10. A composite material component system formed by steps comprising:
    forming a first panel pair by releasably attaching a first panel and a second panel in a fabric sheet by a first fold line;
    forming a second panel pair in the fabric sheet by releasably attaching a second panel and a third panel by a second fold line; and
    releasably attaching the first panel pair and the second panel pair by a tab, the tab having two adjacent triangular portions releasably separated from one another, wherein the panels are folded and stacked such that a number of edges of each panel form a stair step configuration.

11. The composite material component system formed by the steps of claim 10, said steps further comprising:
    incorporating a postage stamp releasably separated from a panel of a panel pair by a tab having two adjacent triangular portions releasably separated from one another.

12. The composite material component system formed by the steps of claim 10, said steps further comprising:
    releasably attaching a postage stamp to one panel by a tab at the end of said composite material component system.

13. The composite material component system of claim 10, wherein an upper panel in the stair step configuration comprises an identifying marking.

14. A composite material component, comprising:
    a fabric sheet having a first panel and a second panel, the second panel being releasably attached to the first panel by a first fold line to form a first panel pair;
    a second panel pair in the fabric sheet adjacent to and releasably separated from the first panel pair by a tab, the second panel pair comprising a third panel and a fourth panel releasably attached by a second fold line; and additional panel pairs in the fabric sheet, each additional panel pair releasably separated from an adjacent panel pair by a tab, wherein the panels in the component are folded and stacked such that a number of edges of each panel form a stair step configuration.

15. The composite material of clam 14, wherein the first and second panels have straight side edges, and wherein the tab is of triangular shape.

16. The composite material of claim 14, wherein the first and second panels have curved side edges, and wherein the tab is of a curved shape.

17. The composite material component of claim 14, wherein an upper panel in the stair step configuration comprises an identifying marking.

\* \* \* \* \*